(12) United States Patent
Huang et al.

(10) Patent No.: US 12,443,322 B2
(45) Date of Patent: Oct. 14, 2025

(54) CURSOR CONTROL METHOD AND CURSOR CONTROL DEVICE WHICH CAN IMPROVE CURSOR MOVEMENT RANGE AND ACCURACY

(71) Applicant: PixArt Imaging Inc., Hsin-Chu (TW)

(72) Inventors: Chao-Chien Huang, Hsin-Chu (TW); Yi-Chung Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 434 days.

(21) Appl. No.: 17/862,381

(22) Filed: Jul. 11, 2022

(65) Prior Publication Data

US 2023/0140548 A1    May 4, 2023

Related U.S. Application Data

(60) Provisional application No. 63/272,693, filed on Oct. 28, 2021.

(51) Int. Cl.
   *G06F 3/04812*    (2022.01)
   *G06F 3/0338*    (2013.01)
   *G06F 3/0487*    (2013.01)

(52) U.S. Cl.
   CPC ........ *G06F 3/04812* (2013.01); *G06F 3/0338* (2013.01); *G06F 3/0487* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 6,257,983 B1* | 7/2001 | Rimoto | ............... | G06F 3/038 463/3 |
| 6,525,746 B1* | 2/2003 | Lau | ............ | G11B 27/34 375/E7.076 |
| 9,733,788 B2* | 8/2017 | Ostergren | ............ | G06F 3/0338 |
| 10,515,140 B1* | 12/2019 | Scott | ............ | G06F 3/048 |
| 10,611,451 B1* | 4/2020 | Andrasko | ............ | B63H 21/213 |
| 2007/0290994 A1* | 12/2007 | Kawasaki | ........... | G06F 3/04892 345/157 |
| 2008/0278448 A1* | 11/2008 | Nilsagard | ............. | G05G 9/053 345/161 |
| 2012/0154377 A1* | 6/2012 | Sato | ............ | G06T 19/20 345/419 |
| 2016/0202888 A1* | 7/2016 | Yoshioka | ............ | G06F 3/04845 715/800 |
| 2022/0137705 A1* | 5/2022 | Hashimoto | ............. | G06F 3/165 345/156 |

\* cited by examiner

*Primary Examiner* — Maria S Ayad
(74) *Attorney, Agent, or Firm* — Winston Hsu

(57) ABSTRACT

A cursor control method, for moving a cursor on a first displayed image and a second displayed image, comprising: (a) receiving a first displacement value when the cursor is within a first region of the first displayed image and receiving a second displacement value when the cursor is within a second region of the first displayed image; (b) moving the cursor with a first moving value on the first displayed image, which is obtained from the first displacement value and a first ratio; and (d) moving the cursor with a second moving value on the second displayed image, which is obtained from the second displacement value and a second ratio; wherein the first ratio is different from the second ratio; wherein the second displayed image is a zoom out and partial image of the first displayed image. By this way, the cursor movement accuracy can be increased.

13 Claims, 7 Drawing Sheets

CURSOR CONTROL METHOD AND CURSOR CONTROL DEVICE WHICH CAN IMPROVE CURSOR MOVEMENT RANGE AND ACCURACY

CROSS REFERENCE TO RELATED APPLICATIONS

This application claims the benefit of U.S. Provisional Application No. 63/272,693, filed on Oct. 28, 2021. The content of the application is incorporated herein by reference.

BACKGROUND OF THE INVENTION

1. Field of the Invention

The present invention relates to a cursor control method and a cursor control device, and particularly relates to a cursor control method and a cursor control device which can improve a cursor movement range and a cursor movement accuracy.

2. Description of the Prior Art

In modern life, a joystick is a fairly common device. The joystick can be applied to move a cursor to a target point. However, the movement range of the cursor per time may be limited due to the structure of the joystick.

Further, if the user wants to move a cursor to a target on a displayed image with a high resolution, the cursor is hardly to be moved to a precise position of the target point by the joystick, since the movement of the cursor is very sensitive to the control of the joystick.

SUMMARY OF THE INVENTION

Therefore, one objective of the present invention is to provide a cursor control method and a cursor control device which can improve a cursor movement range.

Another objective of the present invention is to provide a cursor control method and a cursor control device which can improve a cursor movement accuracy.

One embodiment of the present invention discloses a cursor control method, applied to a navigation input device for moving a cursor on a first displayed image and a second displayed image, comprising: (a) receiving a first displacement value from the navigation input device when the cursor is within a first region of the first displayed image and receiving a second displacement value from the navigation input device when the cursor is within a second region of the first displayed image; (b) moving the cursor with a first moving value on the first displayed image when the cursor is within the first region, and the first moving value is obtained from the first displacement value and a first ratio; and (d) moving the cursor with a second moving value on a second displayed image when the cursor is within the second region, and the second moving value is obtained from the second displacement value and a second ratio; wherein the first ratio is different from the second ratio; wherein the second displayed image is a zoom out and partial image of the first displayed image.

Another embodiment of the present invention discloses a cursor control method, applied to a navigation input device for moving a cursor on a first displayed image, comprising: (a) receiving a first displacement value from the navigation input device when the cursor is within a mapping region of the first displayed image; (b) moving the cursor with a first moving value on the first displayed image when the cursor is within the mapping region, and the first moving value is obtained from the first displacement value and a first ratio; and (d) moving the cursor on the first displayed image when the cursor is within the extension region, corresponding to a moving direction of the cursor in the mapping region but not corresponding to the moving value.

A cursor control device which can perform the above-mentioned cursor control methods is also disclosed.

In view of above-mentioned embodiments, the cursor movement range can be increased due to usage of the extension range. Also, a cursor movement accuracy can be increased due to the usage of the enlarged image (second displayed image).

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term "first", "second", "third" in following descriptions are only for the purpose of distinguishing different elements, and do not mean the sequence of the elements. For example, a first device and a second device only mean these devices can have the same structure but are different devices.

Figure 1:
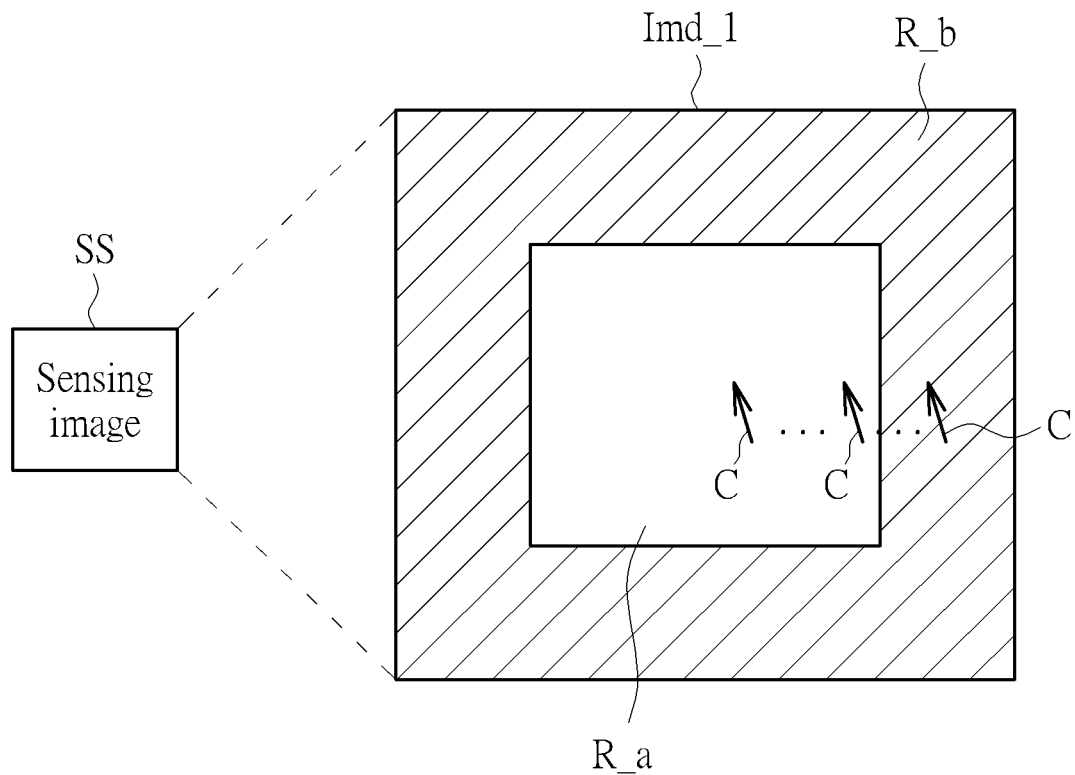
FIG. 1 is a schematic diagram illustrating a cursor control method according to one embodiment of the present invention.

FIG. 1 is a schematic diagram illustrating a cursor control method according to one embodiment of the present invention. The cursor control method is applied to a navigation input device for moving a cursor C on a first displayed image Imd_1. In following embodiments, the navigation input device is a joystick, but not limited. Also, in following embodiments, the term "cursor" is not limited to an object having a cursor shape, other displayed objects which can be moved by the navigation input device, such as a game character, should also fall in the scope of the present invention.

The first displayed image Imd_1 comprises a mapping region R_a and an extension region R_b. The cursor control method provided by the present invention receives a first displacement value from the navigation input device when the cursor C is within the mapping region R_a of the first displayed image. Also, the cursor C moves with a first moving value on the first displayed image Imd_1 when the cursor C is within the mapping region R_a, and the first moving value is obtained from the first displacement value and a first ratio. Further, the cursor C moves on the first displayed image Imd_1 when the cursor C is within the extension region R_b, corresponding to a moving direction of the cursor C in the mapping region R_a but not correspond to the first moving value. Briefly, the cursor C moves corresponding to a first displacement value from the navigation input device while in the mapping region R_a, and moves corresponding to a moving direction of the cursor C in the mapping region R_a but not corresponding to the first displacement value while in the extension region R_b. In the embodiment of FIG. 1, the extension region R_b is surrounding the mapping region R_a, but not limited. Details of the mapping region R_a and the extension region R_b will be described for more detail later.

Figure 2:
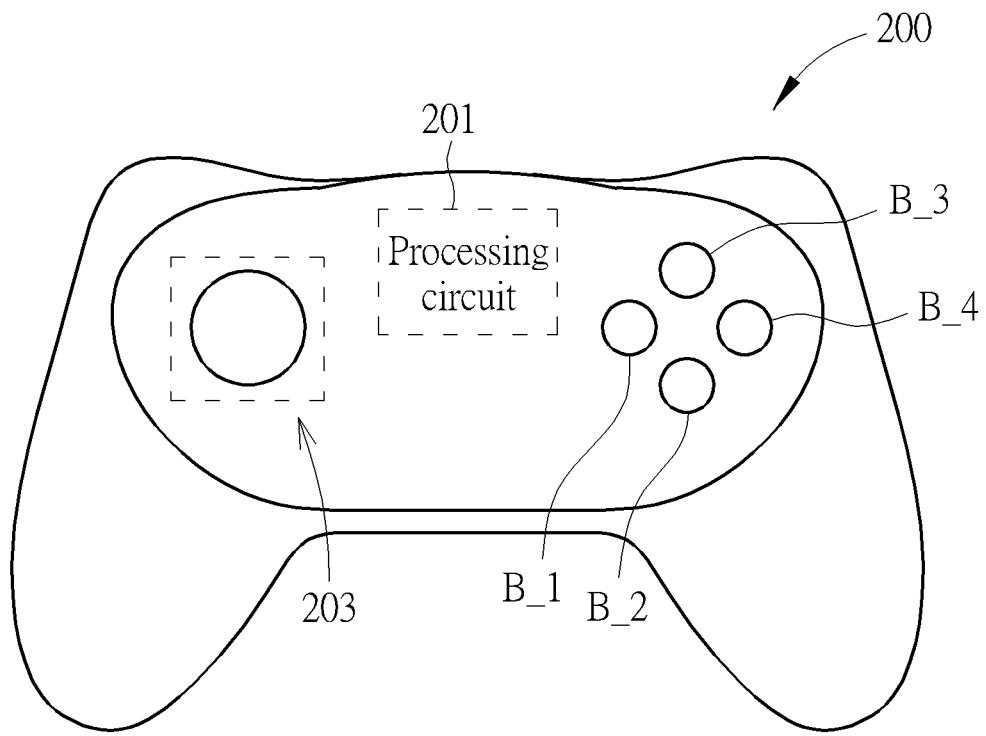
FIG. 2 is a schematic illustrating a gaming controller according to one embodiment of the present invention.

In one embodiment, the navigation input device is a joystick with a pillar, wherein the first displacement value corresponds to a tilt angle of the pillar. FIG. 2 is a schematic illustrating a gaming controller according to one embodiment of the present invention. As illustrated in FIG. 2, the gaming controller 200 comprises a processing circuit 201, a joy stick 203, and buttons B_1, B_2, B_3, B_4. The gaming controller 200 in FIG. 2 is only for example, the gaming controller provided by the present invention is not limited to the embodiment illustrated in FIG. 2. Also, the navigation input device provided by the present invention can be provided to any other cursor control device rather than limited to a gaming controller.

The processing circuit 201 is configured to receive input signals from the joy stick 203 and the buttons B_1, B_2, B_3, B_4, to generate control commands. The joy stick 203 can be controlled by the user to move the above-mentioned cursor C. Therefore, the input signal generated by the joy stick 203 is the above-mentioned first displacement value. After receiving the first displacement value, the processing circuit 201 generates control commands to move the cursor C with the first moving value. For example, the gaming controller 200 can communicate with a game console or a computer, and the processing circuit 201 generates control commands to the processor of the game console or the computer to move the cursor C with the first moving value.

Figure 3:
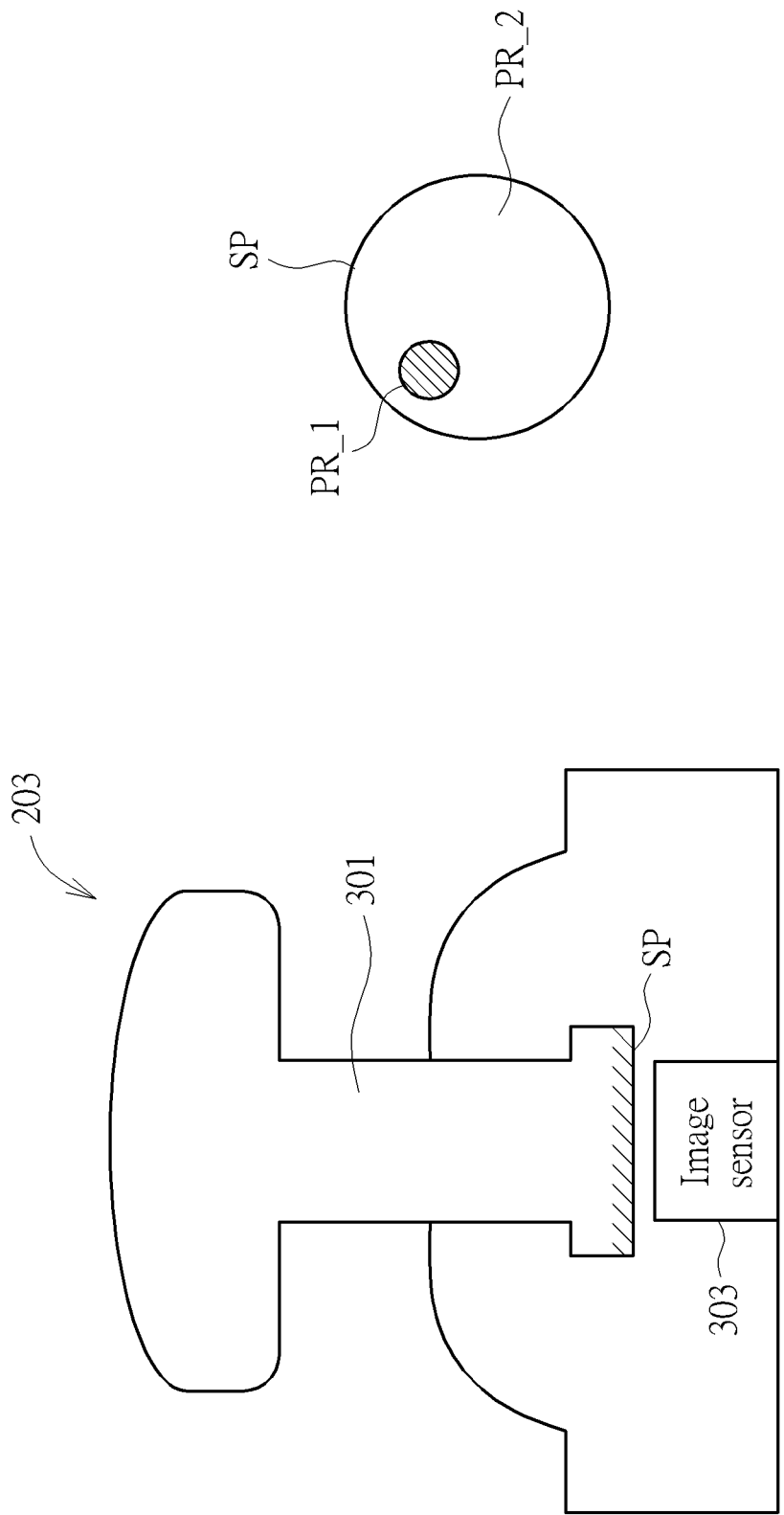
FIG. 3 is a schematic diagram illustrating a joy stick according to one embodiment of the present invention.

FIG. 3 is a schematic diagram illustrating the joy stick 203 of the gaming controller 200 according to one embodiment of the present invention. As illustrated in FIG. 3, the joy stick 203 comprises a pillar 301 and an image sensor 303. Also, a specific pattern SP is provided at a bottom of the pillar 301, and an image sensor 303 is below the pillar 301. Therefore, the image sensor 303 can sense an image of the specific pattern SP. The specific pattern SP moves if the pillar 301 is tilted, which means a user uses the joy stick 203 to move the cursor C. Therefore, corresponding to the embodiment of FIG. 3, the cursor control method provided by the present invention further comprises: capturing a sensing image via the image sensor 303, and the sensing image comprises a specific pattern image of the specific pattern SP. The processing circuit 201 determines the first displacement value according to at least one position of the specific pattern image in the sensing image. the first displacement value corresponds to a tilt angle of the pillar 301.

In one embodiment, as illustrated in FIG. 3, the specific pattern SP comprises a first pattern region PR_1 and a second pattern region PR_2. The first pattern region PR_1 and the second pattern region PR_2 have different colors and sizes. Further, the first pattern region PR_1 is at a location which is not the center point the second pattern region PR_2. However, the specific pattern SP is not limited to the example illustrated in FIG. 3. Any pattern which can provide the same function should also fall in the scope of the present invention. The above-mentioned first ratio is a ratio between the displacement of the specific pattern SP in the sensing image and the displacement of the cursor C on the first displayed image Imd_1. Therefore, the first ratio can be 1, larger than 1, or smaller than 1.

Please refer to FIG. 1 again, in one embodiment, the whole sensing image SS corresponding to the mapping region R_a and the extension region R_b. That is, the mapping region R_a corresponds to a portion of the sensing image SS, and the extension region R_b corresponds to another portion of the sensing image SS. In one embodiment, the extension region R_b corresponds to a border region or an edge region of the sensing image SS. Therefore, if the pillar 301 in FIG. 3 tilts for a small angle, the at least one position of the specific pattern SP can be detected, thus the cursor C can move in the mapping region R_a following the above-mentioned rules (the first moving value is obtained from the first displacement value and a first ratio). Oppositely, if the pillar 301 in FIG. 3 tilts for a large angle, the cursor C only can move to a border of the mapping region R_a according to the first moving value. In such embodiment, after the cursor C moves to the border of the mapping region R_a, the cursor C keeps moving in the extension region R_b following the above-mentioned rules (corresponding to a moving direction of the cursor C in the mapping region R_a). For example, if the pillar 301 tilts for a large angle, the cursor C moves from left to the right corresponding to the tilt angle of the pillar 301 and moves to the border of the mapping region R_a, the cursor C keeps moving right in the extension region R_b. In other words, the movement of the cursor C in the extension region R_b does not correspond to the tile angle of the pillar 301.

Figure 4:
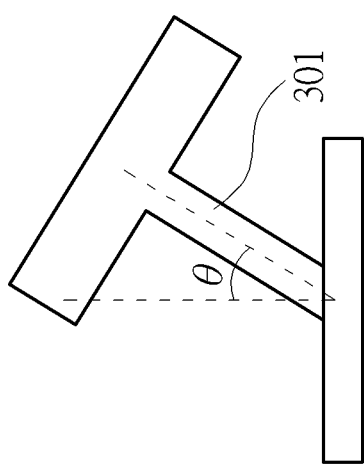
FIG. 4, FIG. 5, FIG. 6, FIG. 7, and FIG. 8 are schematic diagrams illustrating a cursor control method according to another embodiment of the present invention.
Figure 4:
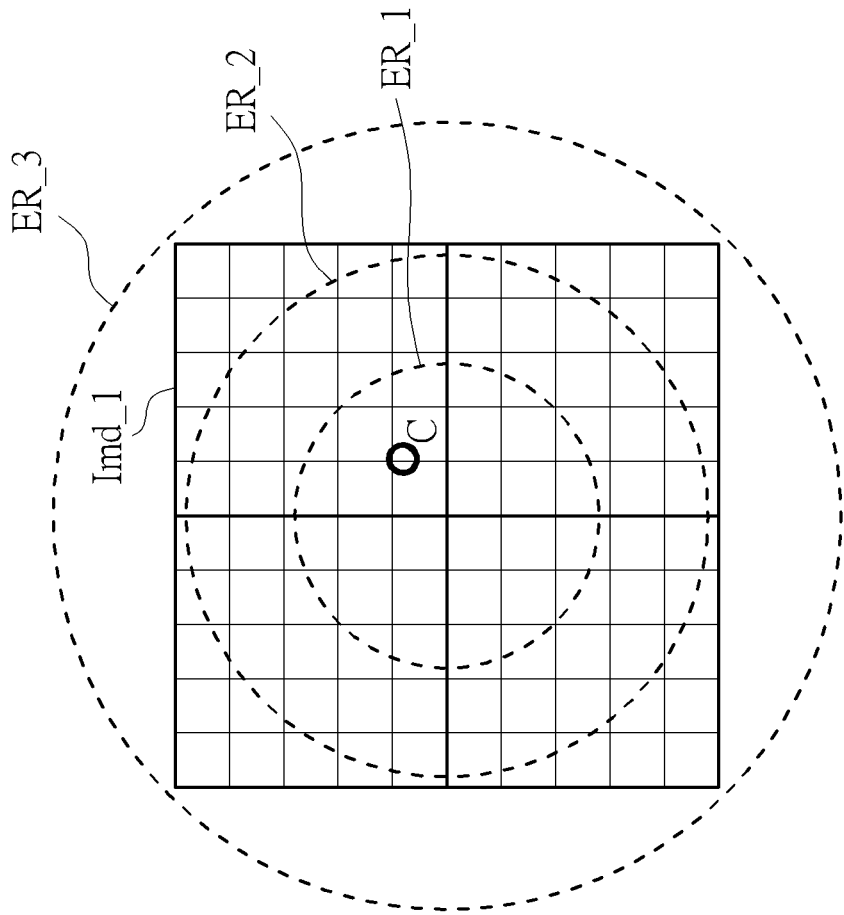

In view of the embodiments illustrated in FIG. 1, the move range of the cursor C can be extended. Besides, the present invention further provides embodiments which can increase a cursor movement accuracy. FIG. 4, FIG. 5, FIG. 6, FIG. 7, and FIG. 8 are schematic diagrams illustrating a cursor control method according to another embodiment of the present invention. FIG. 4 illustrates effective ranges of the cursor. Different ones of the tilt angles θ correspond to different effective ranges. For example, the effective range ER 1 correspond to a θ of 10 degrees, the effective range ER 2 correspond to a θ of 15 degrees, and the effective range ER 3 correspond to a θ of 20 degrees. The cursor moves to a border of the effective range corresponding to a tilt angle of the pillar 301. These effective ranges are related with following embodiments and will be described later.

Figure 5:
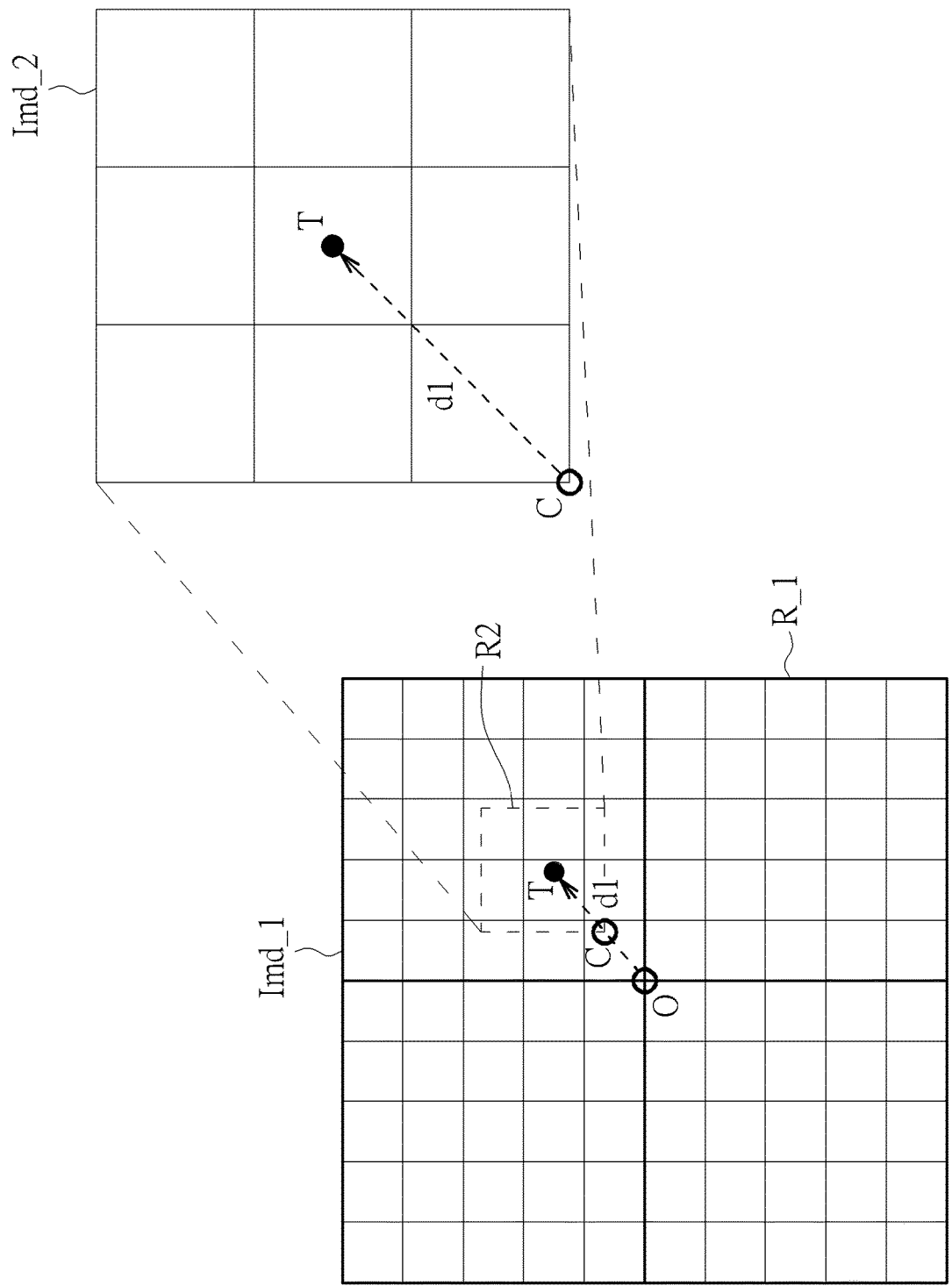

In the embodiment of FIG. 5, a first displayed image Imd_1 and a second displayed image Imd_2 are provided, and the second displayed image Imd_2 is a zoom out (i.e., enlarged) and partial image of the first displayed image Imd_1. In one embodiment, the second displayed image Imd_2 is not triggered by the tilt angle of the pillar 301 in FIG. 3, and is triggered by other methods. In one embodiment, the second displayed image Imd_2 is triggered when the cursor C is close to a target point T in the first displayed image Imd_1. In another embodiment, the second displayed image Imd_2 is triggered when the cursor C moves back and forth in a specific range (i.e., repeatedly move in one direction and then in the opposite direction) in the first displayed image Imd_1, since such operation may mean that the user wants to move the cursor C to a specific point but could not successfully complete this operation. In still another embodiment, if the movement speed of the cursor C in the first displayed image Imd_1 is lower than a threshold speed, or the accumulated displacements of the cursor C in the first displayed image Imd_1 is lower than a threshold displacement, the second displayed image Imd_2 is triggered, since such operations may mean the cursor C is closed to a specific point and the user tries to move the cursor C to the specific point.

In the embodiment of FIG. 5, the processing circuit 201 receives a first displacement value from the joystick 203 when the cursor is within a first region R_1 of the first displayed image Imd_1 and receives a second displacement value from the joystick 203 when the cursor is within a second region R_2 of the first displayed image Imd_1. In one embodiment, the cursor C moves with a first moving value on the first displayed image Imd_1 when the cursor C is within the first region R_1, and the first moving value is obtained from the first displacement value and a first ratio in this embodiment. The first ratio can be 1 or any other value other than 1. In other words, the first moving value completely corresponds to the first displacement value output by the joystick 200.

In the embodiment of FIG. 5, the second region R_2 is a predetermined range of a target point T, and the first range R_1 means other portions of the first displayed image Imd_1, which are not the predetermined range of the target point T. If the cursor C moves into the second region R2, it means the cursor C is close to the target point T. Additionally, in one embodiment, the target point T is displayed at a center point of the second displayed image Imd_2, but the target point T can be displayed at any location of the second displayed image Imd_2.

Also, the cursor C is moved with a first moving value on the first displayed image Imd_1 when the cursor C is within the first region R_1, and the first moving value is obtained from the first displacement value and a first ratio. Besides, the cursor C is moved with a second moving value on the second displayed image Imd_2 when the cursor is within the second region R_2, and the second moving value is obtained from the second displacement value and a second ratio. The first ratio is different from the second ratio. The first ratio means a ratio between the first moving value and the first displacement value, and the second ratio means a ratio between the second moving value and the second displacement value. In one embodiment, the second ratio is smaller than the first ratio.

The concept illustrated in the embodiments of FIG. 4, FIG. 5, FIG. 6, FIG. 7, and FIG. 8 can be applied to the mapping region R_a in FIG. 1, but can also be applied to the extension region R_b in FIG. 1 as well. Further, the concept illustrated in the embodiments of FIG. 4, FIG. 5, FIG. 6, FIG. 7, and FIG. 8 can be implemented by the gaming controller 200 in FIG. 2 and the pillar 203 in FIG. 3. Therefore, in one embodiment, the first displacement value and the second displacement value correspond to tilt angles of the pillar 301.

In other words, initially, the second displayed image Imd_2 is not displayed and the user moves the cursor C on the first displayed image Imd_1. If the cursor C moves in the first region R_1, the second displayed image Imd_2 is still not displayed. However, if the cursor C moves into the predetermined range of the target point T, for example, a distance between the cursor C and the target point T is smaller than the threshold distance d1, the second displayed image Imd_2 is displayed thus the user can move the cursor C on the second displayed image Imd_2 to approach the target point T. As above-mentioned, in one embodiment, the second ratio is smaller than the first ratio, which means the cursor C for a smaller distance in the second displayed image Imd_2 than in the first displayed image Imd_1 when the pillar 301 has the same tilt angle. For example, the cursor C moves for the distance d1 when the pillar 301 tilts for 0.1 degree in the first displayed image Imd_1, but moves for the distance d1 when the pillar 301 tilts for 2 degrees in the second displayed image Imd_2. By this way, the user can precisely control the cursor C to move to the target point T even if the joystick 203 has a high sensitivity. The high sensitivity means the cursor C moves for a long distance when the pillar 301 tilts for a small angle.

Figure 6:
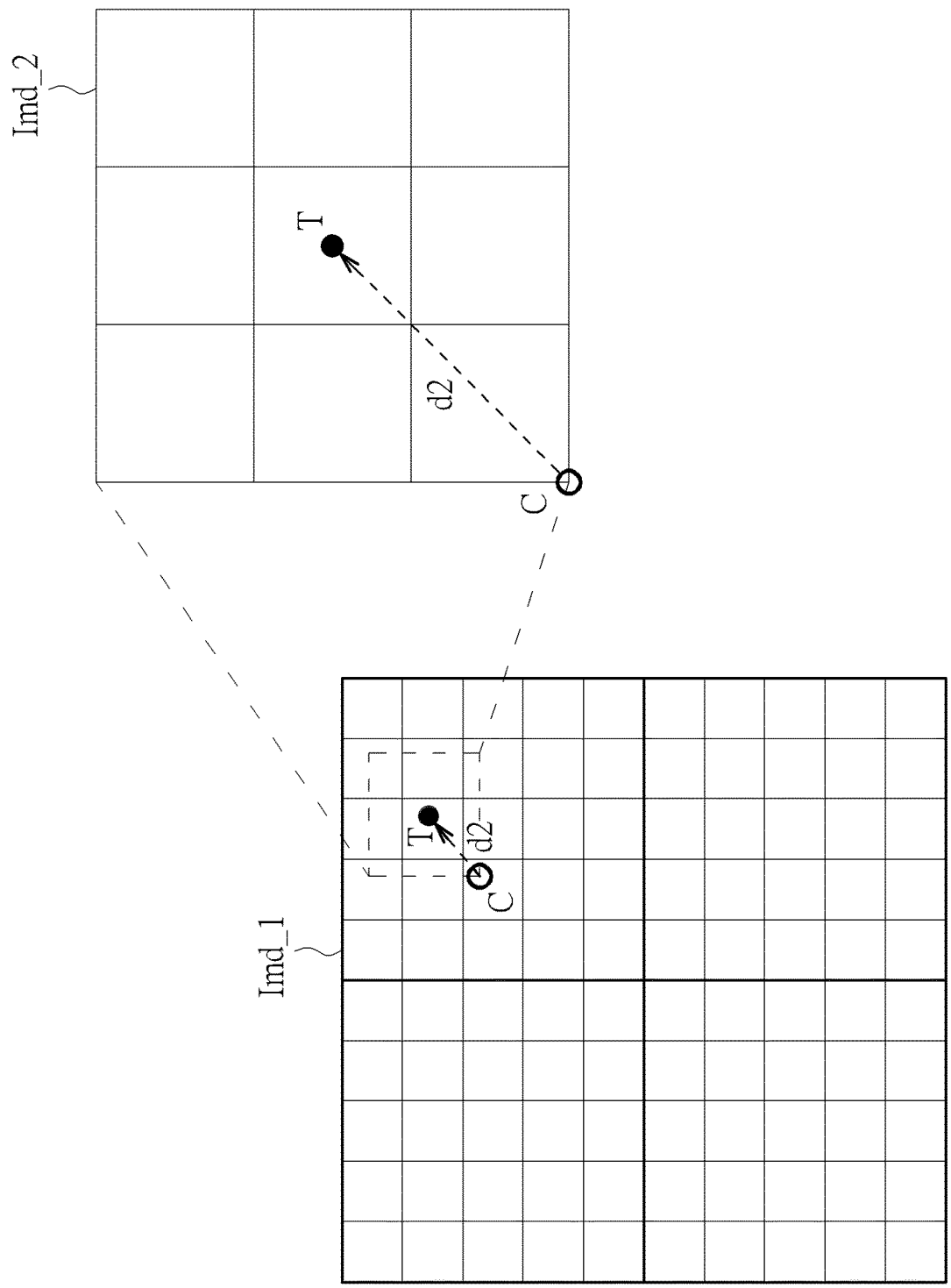
Figure 7:
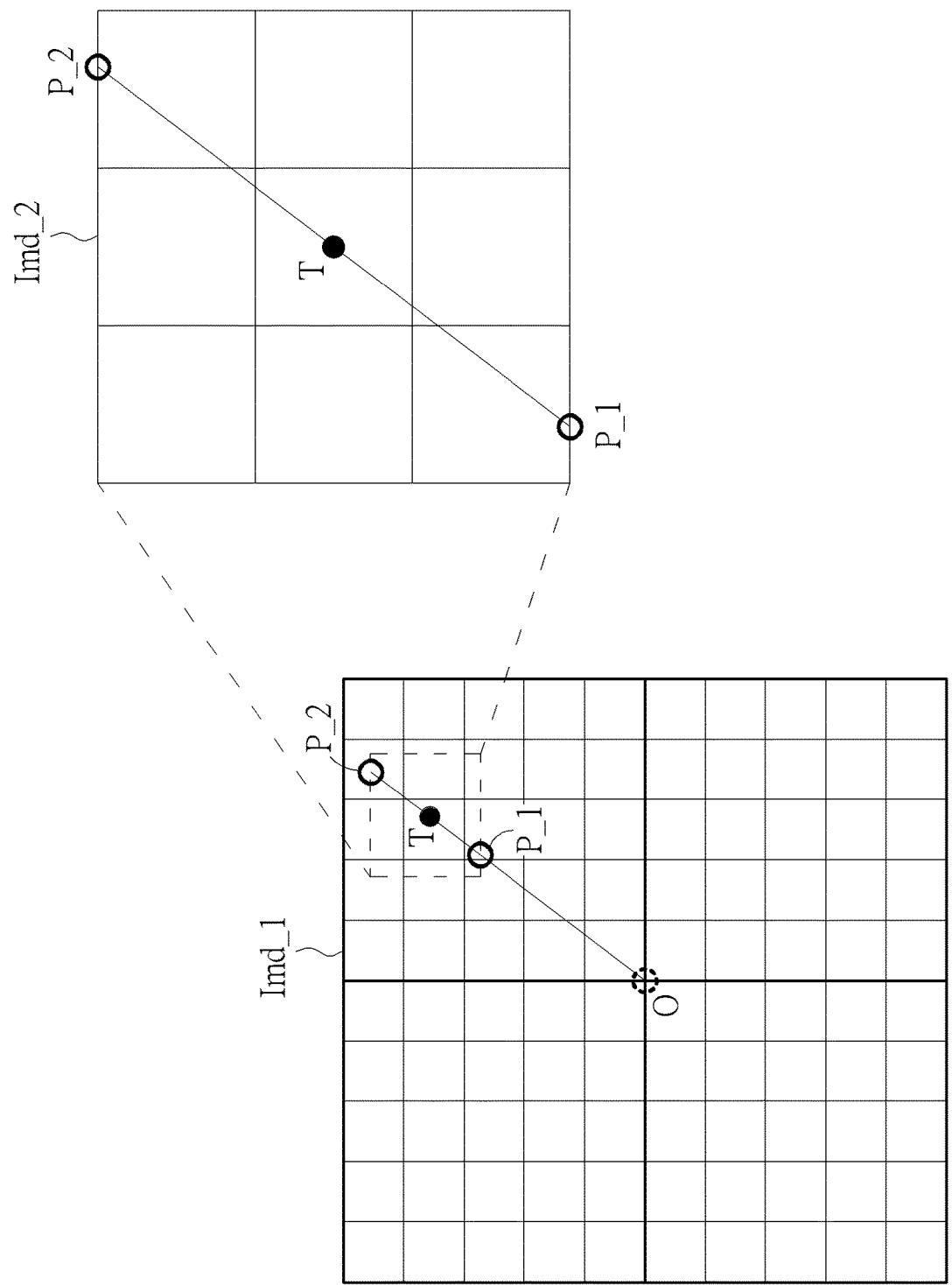

The embodiment illustrated in FIG. 5 can help the user to precisely move the cursor C to the target point T. However, the effective range illustrated in FIG. 4 may be decreased while performing the embodiment illustrated in FIG. 5. For example, as illustrated in FIG. 6, if the threshold distance for activating the second displayed image Imd_2 is d2, and the joystick 203 needs to tilt X degrees to move to the cursor C across the distance d2 in the first displayed image Imd_1. If the zoom out ratio (i.e., enlarge ratio) is Y, the tilt angle which the joystick 203 needs to tilt to move to the cursor C across the distance d2 increases to X*Y in the second displayed image Imd_2. However, such situation may cause some inconvenience for the user, since the maximum tilt angle of the pillar 301 is limited.

To improve the embodiment illustrated in FIG. 6, in one embodiment, a reposition procedure is performed to change the position of the cursor C in the second displace image Imd_2. Specifically, a first position P_1 (the original position) of the cursor C in the second displayed image Imd_2 is changed to a second position P_2 (the changed position) in the second displayed image Imd_2. In one embodiment, the positions of the cursor C in the first displayed image Imd_1 are also correspondingly changed. However, in another embodiment, the positions of the cursor C in the first displayed image Imd_1 are not correspondingly changed.

The first position P_1 and the second position P_2 can be any position in the second displayed image Imd_2. In one embodiment a distance between the target point T and the second position P_2 is smaller than a distance between the target point T and the first position P_1. Also, in the embodiment of FIG. 7, the first position P_1, the second position P_2 and the target point T are located sequentially in a line. Further, in the embodiment of FIG. 7, the first position P_1 and the second position P_2 are at the border of the second displayed image Imd_2. In one embodiment, the reposition procedure is executed if a distance of the target point T and a boundary of the effective range illustrated in FIG. 4 is smaller than a threshold distance, which means the target point T is near to the boundary of the effective range, or the target point T is outside the effective range.

Figure 8:
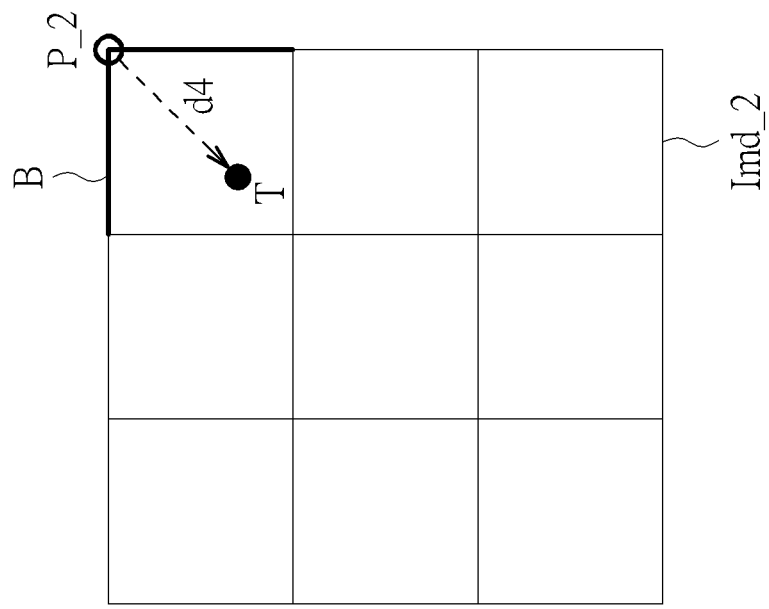
Figure 8:
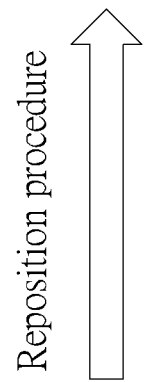
Figure 8:
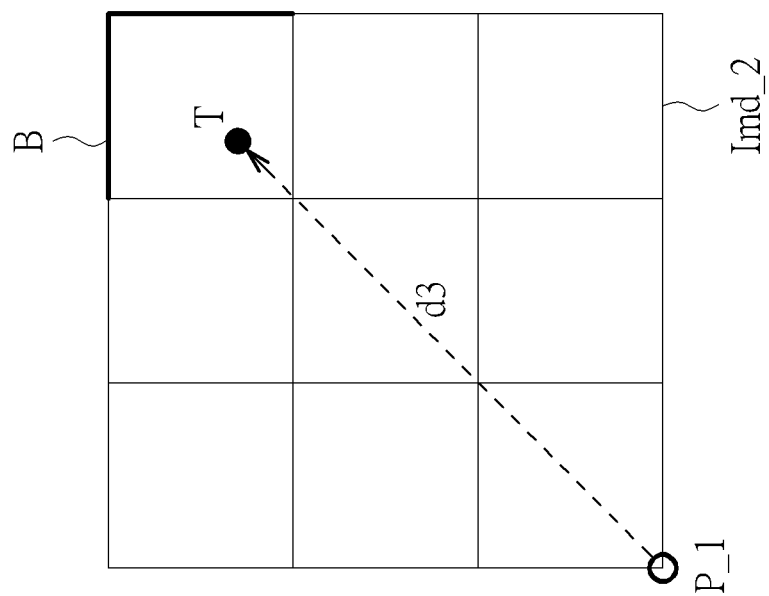

As above-mentioned, the target point C can locate at any other location of the second displayed image besides the center point. As illustrated in FIG. 8, the target point T is at the upper right corner of the second displayed image Imd_2, since the target point T is close to a boundary B of the first displayed image Imd_1. In such case, the cursor C is changed from the first position P_1 to the second position P_2. Therefore, in the embodiment of FIG. 8, the distance d4 between the second position P_2 (the changed position) and the target point T is smaller than the distance d3 between the first position P_1 (the original position) and the target point T. In one embodiment, the cursor C is displayed when a location of the cursor C is the second position P_2 but not displayed when a location of the cursor C is at the first position P_1.

Accordingly, in the embodiment of FIG. 8, the reposition procedure is executed if a target point T is detected near a boundary B (or named a corner) of the first displayed image Imd_1 and the cursor C is far from the boundary B which the target point T is close to. By this way, the cursor C is moved to the boundary B which the target point T is close to. In other words, a location of the cursor C in the second displayed image Imd_2 is changed if a distance between a target point T and a boundary B of the first displayed image Imd_1 is smaller than a first threshold distance and a distance between the border B and the cursor C is larger than the first threshold distance, wherein the cursor C is moved to a position close to or at the border B. Please note, although the border B belongs to the second displayed image Imd_2 in the embodiment of FIG. 8, the border B also belongs to the first displayed image Imd_1 since the second displayed image Imd_2 is partial of the first displayed image Imd_1.

In view of above-mentioned embodiments, the cursor movement range can be increased due to usage of the extension range. Also, a cursor movement accuracy can be increased due to the usage of the enlarged image (second displayed image).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cursor control method applied to a navigation input device for moving a cursor on a first displayed image and a second displayed image, the method comprising:
   (a) receiving a first displacement value from the navigation input device when the cursor is within a first region of the first displayed image and receiving a second displacement value from the navigation input device when the cursor is within a second region of the first displayed image;
   (b) moving the cursor with a first moving value on the first displayed image when the cursor is within the first region, the first moving value being obtained from the first displacement value and a first ratio; and
   (c) moving the cursor with a second moving value on the second displayed image when the cursor is within the second region, the second moving value being obtained from the second displacement value and a second ratio;
   wherein the first ratio is different from the second ratio;
   wherein the second displayed image is an enlarged portion of the first displayed image;
   wherein displaying of the second displayed image is triggered responsive to at least one of the following conditions being met:
      the cursor being within a predetermined range of a target point in the first displayed image;
      the cursor repeatedly moving in a direction and then in an opposite direction of the direction in the first displayed image;
      the movement speed of the cursor in the first displayed image being lower than a threshold speed; and
      an accumulated displacement of the cursor in the first displayed image being lower than a threshold displacement; and
   wherein the cursor control method further comprises changing a first position of the cursor in the second displayed image to a second position in the second displayed image,
      the changing of the position of the cursor in the second displayed image occurring responsive to (i) a distance between the target point and a corner of the second displayed image being smaller than a threshold distance and (ii) the distance between the cursor and the corner of the second displayed image being larger than the threshold distance, and
      the second position in the second displayed image being located at the corner.

2. The cursor control method of claim 1, wherein the navigation input device is a joystick with a pillar, wherein each of the first displacement value and the second displacement value corresponds to a corresponding tilt angle of the pillar.

3. The cursor control method of claim 2, wherein the pillar has a specific pattern, wherein the cursor control method further comprises:
   capturing a sensing image via an image sensor, wherein the sensing image comprises a pattern image of the specific pattern; and
   computing the tilt angle according to at least one position of the specific pattern image in the sensing image.

4. The cursor control method of claim 1, wherein the first ratio is larger than the second ratio.

5. The cursor control method of claim 1, wherein the cursor is displayed when a location of the cursor is the second position but not displayed when the location of the cursor is the first position.

6. The cursor control method of claim 1, wherein the first position and the second position are at different sides of the target point in the second displayed image.

7. The cursor control method of claim 1, wherein the distance between the first position and the target point is larger than the distance between the second position and the target point in the second displayed image.

8. A cursor control device for moving a cursor on a first displayed image and a second displayed image, the device comprising:
   a navigation input device;
   a processing circuit, configured to perform the following steps:
   (a) receiving a first displacement value from the navigation input device when the cursor is within a first region of the first displayed image and receiving a second displacement value from the navigation input device when the cursor is within a second region of the first displayed image;
   (b) moving the cursor with a first moving value on the first displayed image when the cursor is within the first region, the first moving value being obtained from the first displacement value and a first ratio; and
   (c) moving the cursor with a second moving value on the second displayed image when the cursor is within the second region, the second moving value being obtained from the second displacement value and a second ratio;
   wherein the first ratio is different from the second ratio;
   wherein the second displayed image is an enlarged portion of the first displayed image;
   wherein displaying of the second displayed image is triggered responsive to at least one of the following conditions being met:
      the cursor being within a predetermined range of a target point in the first displayed image;
      the cursor repeatedly moving in a direction and then in an opposite direction of the direction in the first displayed image;
      the movement speed of the cursor in the first displayed image being lower than a threshold speed; and
      an accumulated displacement of the cursor in the first displayed image being lower than a threshold displacement; and wherein the cursor control method further comprises changing a first position of the cursor in the second displayed image to a second position in the second displayed image, the changing of the position of the cursor in the second displayed image occurring responsive to (i) a distance between the target point and a corner of the second displayed image being smaller than a threshold distance and (ii) the distance between the cursor and the corner of the second displayed image being larger than the threshold distance, and the second position in the second displayed image being located at the corner.

9. The cursor control device of claim 8, wherein the navigation input device is a joystick with a pillar, wherein each of the first displacement value and the second displacement value corresponds to a corresponding tilt angle of the pillar.

10. The cursor control device of claim 9, wherein the joystick comprises an image sensor and the pillar has a specific pattern, wherein the processing circuit further performs:

controlling the image sensor to capture a sensing image, wherein the sensing image comprises a pattern image of the specific pattern; and computing the tilt angle according to at least one position of the specific pattern image in the sensing image.

11. The cursor control device of claim 8, wherein the first ratio is larger than the second ratio.

12. The cursor control device of claim 8, wherein the first position and the second position are at different sides of the target point in the second displayed image.

13. The cursor control device of claim 8, wherein the distance between the first position and the target point is larger than the distance between the second position and the target point in the second displayed image.

* * * * *